United States Patent

Hamner

[11] Patent Number: 5,129,447
[45] Date of Patent: Jul. 14, 1992

[54] COOLED BOLTING ARRANGEMENT

[75] Inventor: Larry D. Hamner, Palm City, Fla.

[73] Assignee: United Technologies Corporation, Hartford, Conn.

[21] Appl. No.: 702,469

[22] Filed: May 20, 1991

[51] Int. Cl.[5] .............................. F16B 11/00; F25G 3/00; F02C 7/20

[52] U.S. Cl. .......................................... 165/47; 60/752; 60/39.83; 60/757; 165/134.1; 165/168; 165/169; 403/23; 403/24; 403/34; 403/408.1; 411/14; 411/395; 411/411

[58] Field of Search ................... 165/47, 134.1, 168, 165/169; 60/755, 757, 752, 39.83; 403/23, 24, 34, 408.1; 411/14, 395, 411

[56] References Cited

U.S. PATENT DOCUMENTS

| | | | |
|---|---|---|---|
| 2,320,398 | 6/1943 | Zetterquist | 165/134.1 |
| 3,209,640 | 10/1965 | Waivers | 85/1 |
| 3,408,812 | 11/1968 | Stenger | 60/757 |
| 4,302,941 | 12/1981 | DuBell | 60/757 |
| 4,597,258 | 7/1986 | Harris | 60/752 |
| 4,748,806 | 6/1988 | Drobny | 60/752 |
| 4,749,029 | 6/1988 | Becker et al. | 165/169 |
| 4,749,298 | 6/1988 | Bundt et al. | 165/169 |
| 4,820,097 | 4/1989 | Maeda et al. | 411/366 |
| 4,944,151 | 7/1990 | Hovnanian | 60/752 |

FOREIGN PATENT DOCUMENTS 2923913 12/1980 Fed. Rep. of Germany ........ 165/56

Primary Examiner—John Ford
Attorney, Agent, or Firm—Edward L. Kochey, Jr.

[57] ABSTRACT

A fluid cooled thermal skin is bolted to a sufficient back structure. In-line coolant flow paths are arranged to pass the cooling fluid through the bolt head. The in-line paths are recessed adjacent the bolt head to mate with flow openings in the head. In one embodiment the paths through the bolt head are parallel paths, requiring alignment of the bolt head. In another embodiment alignment of the bolt head is not required.

7 Claims, 3 Drawing Sheets ical skin. The portion 28 of each parallel skin flow path
COOLED BOLTING ARRANGEMENT The Government has rights in this invention pursuant to a contract awarded by the Department of the Air Force.

Description

1. Technical Field

The invention relates to fastening of cooled thermal shields in a hypersonic hot environment, and in particular to a cooled bolt head arrangement therefor.

2. Background of the Invention

Hypersonic engines can require conveyance of hot gas such that the heat transfer rates to the gas path surfaces are on the order of 2,000 BTU/foot$^2$/second. The back structure must be protected with a heat exchanger thermal shield. This shield may use hydrogen cooling by passing a flow of hydrogen through parallel flow paths just below the hot surface.

The thermal shield, together with any support structure, must be fastened to the back structure. Repair or replacement of the thermal shield is most simply carried out if the shield can be fastened to the back structure with removal bolts accessible from inside the gas path.

The heads of such bolts are exposed to the same heat flux and therefore are subject to melting or substantially reduced strength and corrosion resistance. A means to permit the bolts to survive and function in such an extreme environment is desirable.

Flow perturbations in the hypersonic environment must also be avoided because of the supplemental high local heating caused by such flow perturbations.

SUMMARY OF THE INVENTION

The back structure is protected by a thermal skin heat exchanger which is mounted to a support structure. A round bolt receiving opening in the thermal skin has an outwardly facing skin shoulder surrounding the opening and recessed below the surface of the thermal skin. The portion of the parallel skin flow paths of the heat exchanger which intersect the opening having an increased distance from the surface of the thermal skin at a mating location below the shoulder.

A bolt has a shank adapted for connection to the back structure. A round bolt head on this bolt has a head surface substantially coplanar with the surface of the thermal skin. It also has a bolt shoulder facing the skin shoulder. A seal is located between the two shoulders, preferably a C-seal with sufficient compressibility to maintain contact through one-half turn of the bolt.

Within the head of the bolt of one embodiment are parallel flow paths with each parallel flow path at each end with each parallel flow path at each end aligned with the skin flow paths at the mating locations. Two wrench depressions (50) on the head of the bolt may be utilized to assure proper alignment of the flow paths in the head with those in the skin.

DESCRIPTION OF THE PREFERRED EMBODIMENT

Figure 1:
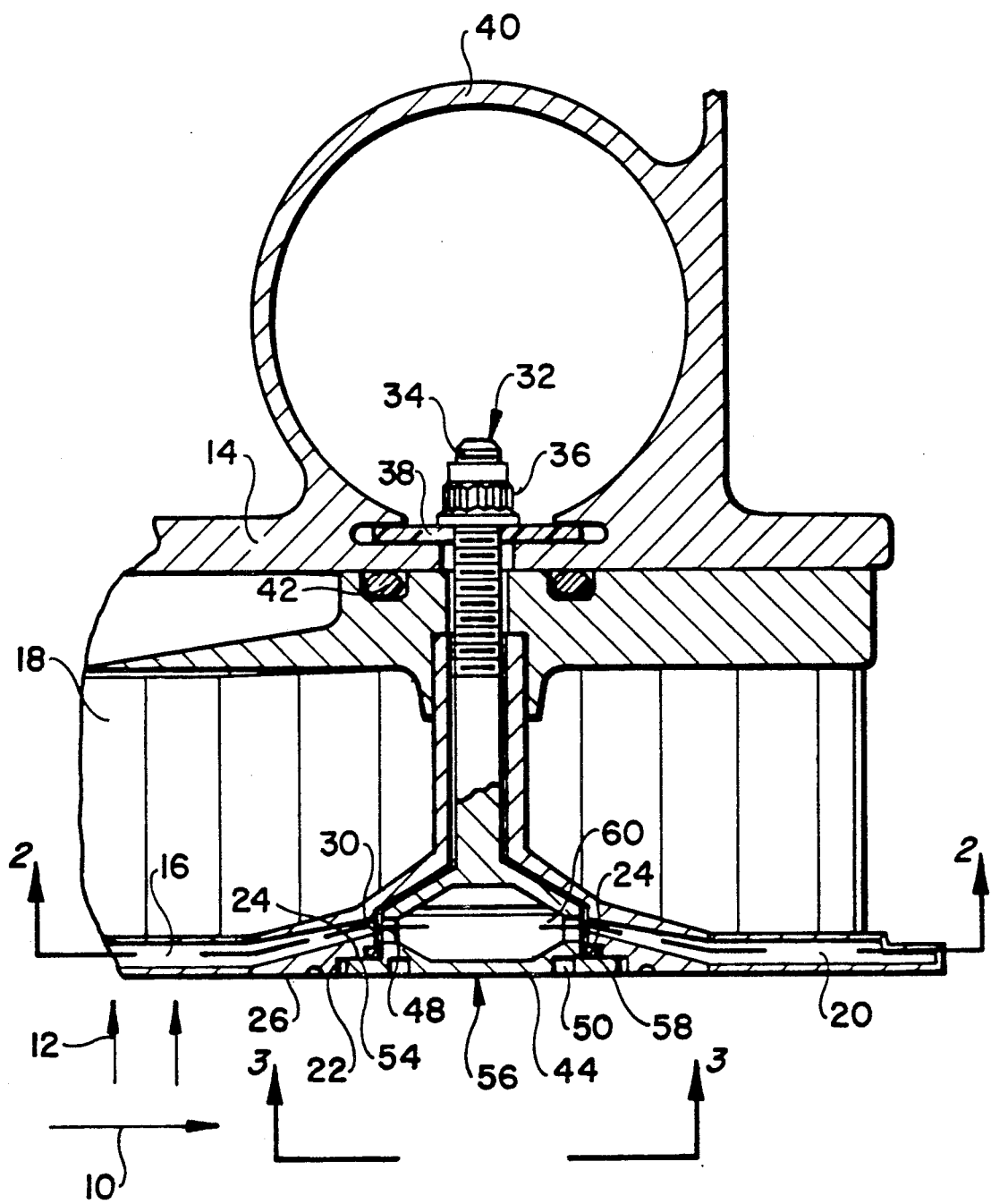
FIG. 1 is a sectional view through a bolted connection.
Figure 2:
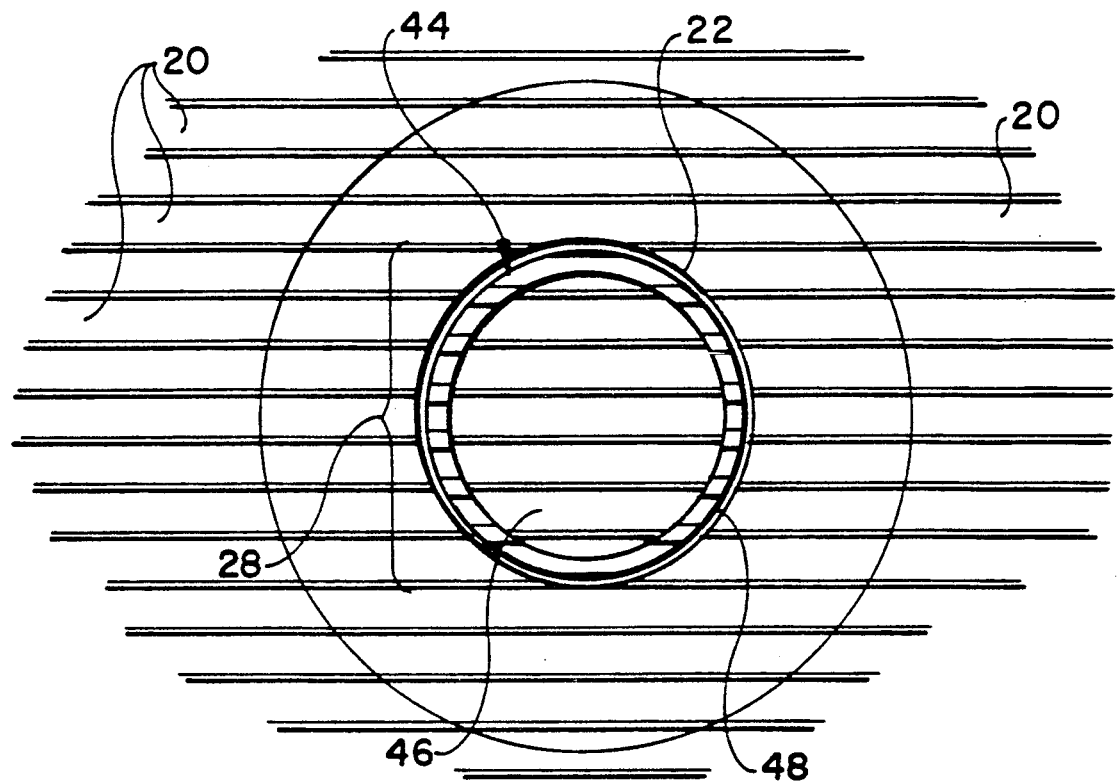
FIG. 2 is a top sectional view of the connection from the gas side.
Figure 3:
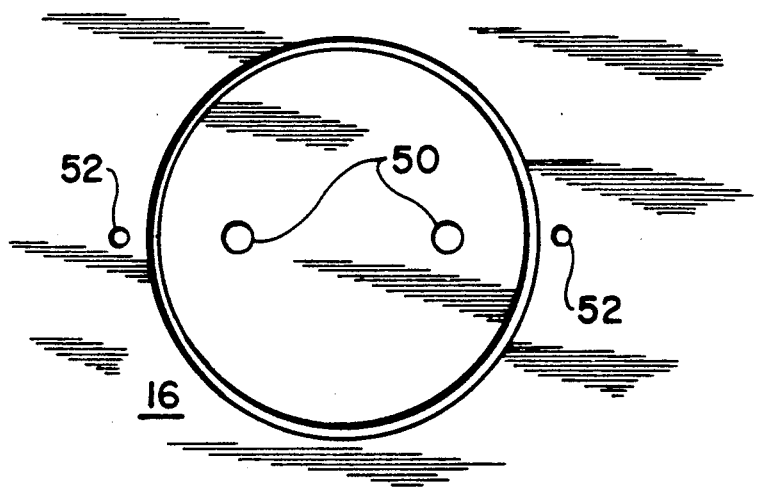
FIG. 3 is a top view of the connection from the gas side.

Referring to FIG. 1, in a hypersonic vehicle a flow of hot gas 10 creates an extremely high heat transfer rate 12 in the order of 2,000 BTU's per square foot per second. The main framing back structure 14 must be protected from this heat flux. Thermal skin 16 mounted on a honeycomb support structure 18 is actually a heat exchanger. Liquid hydrogen from fuel storage in route to the combustor passes through a plurality of parallel skin flow paths 20 for cooling of the surface and removal of heat. A round bolt receiving opening 22 in the skin has adjacent thereto an outwardly facing skin shoulder 24 recessed below the surface 26 of the thermal skin. The portion 28 of each parallel skin flow path 20 which intersects the opening 22 has an increased distance at location 30 from the skin surface. This comprises a mating location.

Bolt 32 has a shank 34 adapted for connection to the back structure 14 with self locking nuts 36 being held within nut strip 38. Structure 40 may be used to provide a gas tight seal thereby preventing any leakage passed the nuts and shank from escaping. Seal 42 also cooperates in this respect.

A round bolt head 44 on the bolt has parallel head flow paths 46 therethrough. At each end 48, these are aligned with the skin flow paths at the mating location 30.

These are aligned in the same direction as the parallel head flow paths within the bolt head. Therefore, when these are aligned in the axial direction it is known that the head flow paths are in line with the skin flow paths. Small indentations 52 on the skin may be provided if desired to facilitate alignment.

The bolt head 44 has a bolt shoulder 54 facing the skin shoulder 24. The head surface 56 of the head is substantially coplanar with the surface 26 of the thermal skin to avoid flow perturbations which would lead to local heating.

Seal 58 is located between shoulders 24 and 54. This seal is preferably of the C-type with the opening of the C facing the center of the bolt. It should have sufficient resiliency to remain in contact with the adjacent surfaces throughout one-half turn of the bolt since this may be required to achieve proper alignment. The C-shaped seal permits the internal pressure from the bolt side to open up the seal and thereby effect sealing with increased force occurring with increased pressure.

Figure 4:
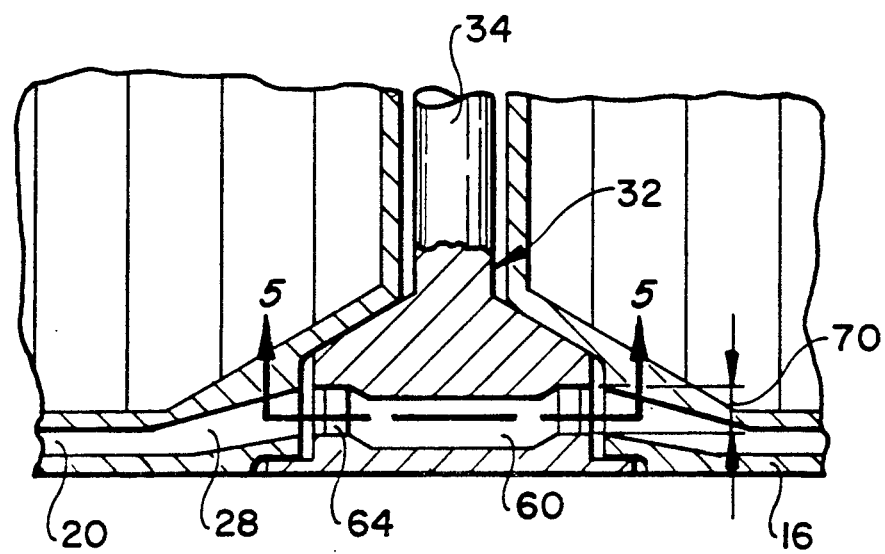
FIG. 4 is a section through an alternate bolt head not requiring alignment.
Figure 5:
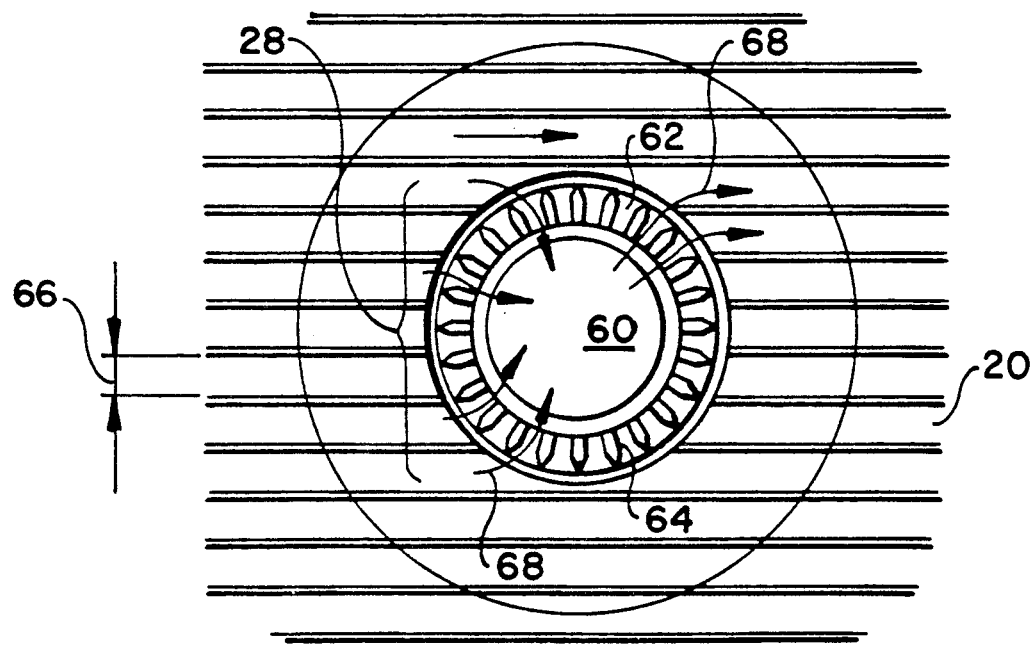
FIG. 5 is a section through the bolt head of FIG. 4.

FIGS. 4 and 5 illustrate an alternate arrangement which does not require alignment of the bolt head. The bolt head has an empty central chamber 60 and around the periphery of the bolt head are plurality of radial openings 62 between posts 64. The centerline to centerline spacing of posts 64 should be at least equal to the width 66 of the flow paths 20. This will preclude two posts blocking a flow path except in those areas where the bolt head intersects the flow path diagonally providing additional flow area. The flow through the flow path 20 passes as shown by flow arrows 68 into the center 60 and out the other side of the bolt head into the continuation of flow channels 20.

The amount of pressure drop in the hydrogen flow which can be tolerated is a function of the overall heat exchange circuits. It can be seen that the flow is partially blocked by the posts and that there is an exit loss into the chamber as well as an entrance loss into the succeeding flow paths. The pressure loss is to some extent alleviated since the height of flow path 20 is increased in the flow path portion 28 to a height 70, which in this case is about twice the height of flow path 20. This reduces the flow velocity to one-half the pre-existing velocity and the velocity head to one-quarter of its previous value. This has a substantial effect in the reduction of the pressure drop occurring in passage into, through, and out of the bolt head.

It is recognized, however, that this decreased velocity can result in decreased heat transfer capability. While this is somewhat offset by the turbulence in the area, it must be checked for the particular design circumstance to provide sufficient remaining heat transfer capability.

While the posts may have blunt ends if the pressure drop is acceptable, flow passage is facilitated by the tapered outer edge of the post decreasing the pressure losses entering and leaving the radial flow passages.

I claim:

1. A bolting arrangement for securing a fluid cooled thermal skin to a back structure in a hypersonic vehicle, said thermal skin having a plurality of parallel of skin flow paths adjacent the surface for conducting a fluid coolant, a support structure supporting and protected by said thermal skin, comprising:
   a round bolt receiving opening in said thermal skin having an outwardly facing skin shoulder surrounding said opening and recessed below the surface of said thermal skin;
   the portion of said parallel skin flow paths intersecting said opening comprising in-line flow paths;
   said in-line flow paths, at locations adjacent said opening, having an increased distance from the surface of said thermal skin to a mating location below said shoulder;
   a bolt having a shank adapted for connection to said back structure;
   a round bolt head on said bolt, the head surface being substantially coplanar with the surface of said thermal skin, and a bolt shoulder facing said skin shoulder;
   a seal between said skin shoulder and said bolt shoulder;
   said bolt head having parallel head flow paths therethrough, each parallel flow path at each end aligned with said skin flow paths at said mating location; and
   indicating means for indicating when said skin flow paths and said head flow paths are aligned.

2. A bolting arrangement a in claim 1 comprising also:
   said seal being of C-shaped cross section with the openings of the C facing the bolt centerline;
   said seal sufficiently resilient to absorb the compression equal to one-half turn of said bolt.

3. A bolting arrangement as in claim 2 comprising also:
   two wrench depressions on the head of said bolt, said wrench depressions located at known position with respect to said head flow paths, thereby comprising said indicating means.

4. A bolting arrangement for securing a fluid cooled thermal skin to a back structure in hypersonic vehicle, said thermal skin having a plurality of parallel of skin flow paths adjacent the surface for conducting a fluid coolant, a support structure supporting and protected by said thermal skin, comprising:
   a round bolt receiving opening in said thermal skin having an outwardly facing skin shoulder surrounding said opening and recessed below the surface of said thermal skin;
   the portion of said parallel skin flow paths intersecting said opening comprising in-line flow paths;
   said in-line flow paths, at locations adjacent said opening, having an increased distance from the surface of said thermal skin to a mating location below said shoulder;
   a bolt having a shank adapted for connection to said back structure;
   a round bolt head on said bolt, the head surface being substantially coplanar with the surface of said thermal skin, and a bolt shoulder facing said skin shoulder;
   a seal between said skin shoulder and said bolt shoulder; and
   said bolt head having a plurality of head flow paths therethrough, said plurality of flow paths in fluid communication with said skin flow paths at said mating location.

5. A bolting arrangement as in claim 4, said plurality of head flow paths comprising:
   a central chamber; and
   a plurality of radial flow paths from the outer periphery of said bolt head to said chamber.

6. A bolting arrangement as in claim 5, said plurality of head flow paths comprising:
   a post separating each radial flow path;
   spacing of each post at the outer periphery being at least equal to the width of said in-line flow paths.

7. A bolting arrangement as in claim 5, said plurality of head flow paths comprising:
   the depth of said in-line flow paths at the mating location being greater than the depth of said in-line flow paths at locations remote from said mating location.

* * * * *